United States Patent Office 3,382,292
Patented May 7, 1968

3,382,292
PROCESS FOR DIMERIZATION OF LOWER OLEFINS HAVING INTERNAL DOUBLE BONDS
Harry Endler and Fausto Facchini, Ferrara, Italy, assignors to Montecatini Edison S.p.A., Milan, Italy, a corporation of Italy
No Drawing. Filed Jan. 23, 1964, Ser. No. 339,584
Claims priority, application Italy, Jan. 31, 1963, 1,930/63
5 Claims. (Cl. 260—683.15)

Our invention relates to a process for dimerization of lower olefins having a non-terminal double bond (or internal double bond) resulting in the production of dimers of the corresponding alpha-olefins. Our invention relates further to the preparation of new type catalysts for carrying out our dimerization process. Specifically, our invention relates to dimerization of butene-2 (mixture of cis and trans isomers) or $C_4$ mixtures containing butene-2 which yield essentially 2-ethylhexene-1, i.e. the normal dimer of the butene-1.

It is well known that alpha-olefins may be dimerized with the aid of aluminum alkyl compounds, derivatives of aluminum hydride wherein at least one of the hydrogen atoms is substituted by an alkyl group. When alpha-butene (butene-1) is the olefin, 2-ethylhexene-1 is produced. Also well known is the fact that olefins containing a non-terminal double bond may be used in dimerization. The dimer produced is the derivative of the corresponding alpha-olefin, because the starting olefin undergoes isomerization to alpha-olefin and then it dimerizes. Thus, for example, starting with butene-2, in the presence of aluminum alkyl compounds, 2-ethylhexene-1 is formed, the same as would be expected from butene-1. However, dimerization of butene-2 to yield 2-ethylhexene occurs very slowly, because only the amount of butene-1 existing under thermal equilibrium conditions, may react. In fact, as is known, the thermal equilibrium between the normal butenes at the dimerization temperatures is not displaced in favor of butene-1.

It has already been proposed to add finely divided metals, such as nickel, to act as co-catalysts with the aluminum alkyl compounds. The co-catalyst has been added directly in the form of Raney-Ni or in the form of Ni salts, which are subsequently reduced to metal by action of the aluminum alkyl compound. Other metals and salts thereof that have been used are titanium, copper, cobalt, iron and chromium.

In this way dimerization of olefins having an internal double bond to dimers of the corresponding alpha-olefins, is accelerated to the point where the reaction occurs with almost the same rate as starting from the alpha-olefin.

We have found, and this is an object of our invention, that metals used as co-catalysts in dimerization of butene-2 or other olefins containing a non-terminal double bond, may be substituted by other solid but not necessarily metallic substances. These other solid substances come under the definition of a so-called Brönsted and Lewis acid, which has the property of being able to give protons or receive electrons. Among these substances are the aluminum silicates or the aluminum hydrosilicates, the decoloring clays, montmorillonite, the bentonites, zeolite, active aluminum oxide, bauxite ($Al_2O(OH)_4$), kieselguhr, silica gel ($SiO_2$) and others of similar properties. The intrinsic acidity of these substances may be analytically determined, according to the method of O. Johnson (J. Phys. Chem. 59, 827 (1955)), by titration with p-dimethylaminoazobenzene and n-butylamine, in the case of a proton donor acid, or according to the method of H. Pines (J. Am. Chem. Soc. 82 2481–3 (1960)) in the case of an electron acceptor acid. Determination of acidity by ionic exchange with calcium acetate has also been found suitable.

Although it was known that these substances might be used as catalysts for polymerization of olefins to low molecular weight polymers, it was not known that these substances, in spite of their acidic character, would be compatible with alkyl aluminum compounds without causing their decomposition. What was known, in fact, was that aluminum alkyl compounds are highly reactive with substances containing active hydrogen, such as water, alcohols, ketones, acids, and amines, to name a few, and during the reaction they lose their catalytic activity with regard to dimerization. Therefore, it was thought probable that aluminum alkyl compounds also might react with the intrinsic acidity of the Brönsted-Lewis acid co-catalysts.

We have found, according to our invention, that olefins containing a non-terminal double bond are dimerized by contacting these olefins with a catalyst comprising a mixture of aluminum alkyl compounds, such as aluminum tri-alkyl compounds, or aluminum alkyl hydrides, whose alkyl groups contain from 1 to 8 carbon atoms, and solid compounds classified as Brönsted or Lewis acids. These acids are present in amounts of 1 to 20% by weight with respect to the aluminum alkyl compound. Specifically, when butene-2 is the starting material, dimerization yields 2-ethylhexene-1 which corresponds to its respective alpha-olefin. The dimerization may be carried out batchwise in autoclaves or in flow reactors.

As one embodiment of the invention, the catalyst is used in suspension in the reaction mixture, while as another embodiment the catalyst is used in the form of a fixed bed. The reaction pressure is between 50 and 300 atm. and preferably between 200 and 270 atm. The temperature varies between 150 and 250° C., and is preferably 220° C. The aluminum alkyl is in a molar ratio between 0.01 and 0.5, preferably between 0.05 and 0.1 with respect to the mono-olefin, while the co-catalyst is between 1 and 20% with respect to the aluminum alkyl compound.

The process according to our invention may be applied to the dimerization of a great number of olefins containing a non-terminal double bond. It is particularly suitable for the dimerization of lower olefins from $C_4$ to $C_6$. As organic aluminum compounds the derivatives of aluminum hydride may be used, wherein at least one hydrogen atom has been substituted by an alkyl group.

The alkyl radicals preferably are ethyl, propyl, butyl, isobutyl, 2-ethylhexyl and the like. Aluminum triisobutyl, which is transformed during the reaction into aluminum tributyl, is preferred. The catalytic mixture, consisting of aluminum alkyl and co-catalyst may be used several times after the reaction products are separated by distillation under reduced pressure.

The use of Brönsted or Lewis acids as co-catalysts with aluminum alkyls in the process according to the present invention, has the advantage over the well known use of finely divided metals, in that substances easily obtained and of low cost are used. Therefore the additional step of recovery after reaction can be eliminated.

The dimers of olefins having a double internal (non-termininal) bond produced according to the present invention, are equivalent to dimers of alpha-olefins having a double terminal bond. Accordingly, like the latter dimers, the dimers according to the present invention may be used, as long-chain olefins, for starting material in many syntheses. In such syntheses, it is possible to produce, by hydroformylation, aldehydes having $(2n+1)$ carbon atoms (wherein $n$ is the number of C atoms of the starting olefin). From these, by catalytic hydrogenation, it is possible to obtain alcohols having the same chain length, useful as solvents in organic syntheses, or for the preparation of esters with carboxyl acids (phthalic acid, adipic acid, azelaic acid, etc.), giving plastifying properties to polymers.

The invention will be further described in conjunction with the following specific examples, but these examples are merely for purposes of illustration and are not intended to limit the invention thereto.

EXAMPLE 1

1677 g. of butene-2 mixed with 20% by weight of saturated butanes were poured into an autoclave together with 320 g. of triisobutyl aluminum and 20 g. of "Valdol Earth" (commercial decoloring clay) in the form of powder. The composition of this clay, of the bentonite type, was as follows:

| | Percent |
|---|---|
| $SiO_2$ | 64.74 |
| $Al_2O_3$ | 11.35 |
| MgO | 0.74 |
| CaO | 2.82 |
| $Fe_2O_3$ | 0.11 |

The clay after heating for 5 hours at 200° C. had an acidity of 44.8 meq./g. determined according to the method of Johnson. The autoclave was heated to 220° C., under agitation. During 5 hours of operation the pressure went from 250 atm. to 72 atm. Separation of the reaction products gave: 640 g. of 2-ethylhexene-1, 162 g. of other 2-ethylhexenes, which in a hydrogenation process are also transformed into 2-ethylhexane, 250 g. of other octenes or higher hydrocarbons, 273 g. of heptenes and hexenes and 352 g. of butene either untransformed or bound to the catalyst. This corresponds to 79% transformation of starting butene with a 2-ethylhexene-1 yield of 48.3% with respect to transformed butene-2.

EXAMPLE 2

581 g. of butene-2, mixed with 27% by weight of saturated butanes, were poured into an autoclave together with 100 g. of aluminum triisobutyl and 8 g. of powdered aluminum oxide.

After heating at 500° C. for 3 hours, the aluminum oxide had the following composition:

| | Percent |
|---|---|
| $Al_2O_3$ | 99 |
| $Fe_2O_3$ | 0.05 |
| $SiO_2$ | 1 | and had a positive acidity test with phenolphthalein, according to the method of H. Pines. The autoclave was heated to 220° C., and within 4 hours the pressure went from the initial value of 225 atm. to 80 atm. Separation of the products gave: 216 g. of 2-ethylhexene-1, 57 g. of other 2-ethylhexenes, 104 g. of other octenes and high-boiling hydrocarbons, 113 g. of heptenes or lower hydrocarbons, and 91 g. of butene either untransformed or bound to the catalyst. These results correspond to an 84.3% transformation with a yield in ethylhexene of 44.1% with respect to transformed butene-2.

EXAMPLE 3

592 g. of butene-2, containing about 26% by weight of saturated butanes, were poured into an autoclove, kept in agitation, together with 132 g. of a mixture of 88.5 mole percent of aluminum triisobutyl and 11.5% moles of aluminum diisobutylmonohydride and 8 g. of powdered bauxite calcined at 500° C. After calcination at 200° C., the bauxite had the following composition:

| | Percent |
|---|---|
| $Al_2O_3$ | 84.9 |
| $SiO_2$ | 10.3 |
| $TiO_2$ | 3 |
| $Fe_2O_3$ | 1.8 |

In the acidity test, 7.3 meq./g. of acetic acid were freed by ion exchange on contact with an aqueous 20% solution of calcium acetate. The autoclave was heated to 220° C., and within 5 hours the pressure of the autoclave went from the initial value of 225 atm. to 112 atm. Separation of the products gave: 215 g. of 2-ethylhexene-1, 65 g. of other 2-ethylhexenes, 94 g. of other octenes or higher hydrocarbons, 160 g. of heptenes or other low-boiling hydrocarbons and 58 g. of butene, either untransformed or bound to the catalyst. This corresponds to a 90.2% transformation with a 40.2% 2-ethylhexene-1 yield with respect to transformed butene-2.

EXAMPLE 4

592 g. of butene-2, according to Example 3, were poured into an autoclave, kept in agitation, together with 132 g. of a mixture of aluminum triisobutyl and aluminum diisobutyl hydride, and 8 g. of powdered silical gel, calcined at 500° C. for 3 hours. The silical gel before calcination had the following composition:

| | Percent |
|---|---|
| $SiO_2$ | 85.4 |
| NaO | 1.4 |
| Cl | Traces |
| $H_2O$ | 6.5 |
| $Fe_2O_3$—$Al_2O_3$ | 0.9 |

After calcination, it gave a positive reaction when tested with malachite green according to the method of H. Pines. The autoclave was heated to 220° C., and during 5 hours the pressure of the autoclave went from the initial 248 atm. to 117 atm. Separation of the reaction products gave: 216 g. of 2-ethylhexene-1, 64.5 g. of other 2-ethylhexenes, 114 g. of octenes or other high-boiling hydrocarbons, 132 g. of heptenes and other low-boiling hydrocarbons, and 65.5 g. of butene either untransformed or bound to the organic aluminum. This corresponds to an 89% transformation, with a 41% 2-ethylhexene-1 yield with respect to transformed butene-2.

We claim:
1. A process for dimerization of mono-olefins having internal double bonds of dimers of the corresponding alpha-olefins, which comprises contacting said mono-olefins with a catalyst consisting essentially of aluminum alkyl compounds and a Brönsted-Lewis acid co-catalyst selected from the group consisting of natural and artificial aluminum silicates, aluminum oxide, natural and artificial silicon oxides, decoloring clay, bauxite and silica gel, said co-catalyst being in the ratio between 1% and 20% by weight with respect to said aluminum alkyl compounds.

2. A process for dimerization of mono-olefins having internal double bonds to dimers of the corresponding alpha-olefins, which comprises contacting said mono-olefins with a catalyst consisting essentially of aluminum alkyl compounds, wherein said aluminum alkyl compounds are derivatives of aluminum hydride wherein at least one hydrogen atom is substituted by an alkyl radical containing from 1 to 8 carbon atoms, said aluminum alkyl compounds being in a molar ratio between 0.01 and 0.5 with respect to the mono-olefin, and a mixture of Brönsted-Lewis acid co-catalysts selected from the group consisting of natural and artificial aluminum silicates, aluminum oxide, natural and artificial silicon oxides, decoloring clay, bauxite and silica gel, said co-catalysts being in the ratio between 1% and 20% by weight with respect to said aluminum alkyl compounds.

3. A process for dimerization of mono-olefins having internal double bonds to dimers of the corresponding alpha-olefins, which comprises contacting said mono-olefins with a catalyst consisting essentially of aluminum alkyl compounds, wherein said aluminum alkyl compounds consist essentially of a mixture of aluminum triisobutyl and aluminum diisobutyl mono-hydride, and a Brönsted-Lewis acid co-catalyst, said aluminum compounds being in a molar ratio between 0.01 and 0.5 with respect to said mono-olefin, said Brönsted-Lewis acid co-catalyst being selected from the group consisting of natural and artificial aluminum silicates, aluminum oxide, natural and artificial silicon oxides, decoloring clay, bauxite and silica gel, said co-catalyst being in the ratio between 1% and 20% by weight with respect to said aluminum alkyl compounds.

4. A process for dimerization of mono-olefins having internal double bonds to dimers of the corresponding alpha-olefins which comprises contacting said mono-olefins with a catalyst consisting essentially of aluminum alkyl compounds, and a mixture of Brönsted-Lewis acid co-catalysts selected from the group consisting of natural and artificial aluminum silicates, aluminum oxide, natural and artificial silicon oxides, decoloring clay, bauxite and silica gel, said co-catalysts being in the ratio between 1% and 20% by weight with respect to said aluminum alkyl compounds, at a pressure between 50 atm. and 300 atm. and at a temperature between 150° and 250° C.

5. A process of dimerizing butene-2 to the dimer 2-ethylhexene-1, in contact with a catalyst consisting essentially of aluminum alkyl selected from the group consisting of aluminum triisobutyl, aluminum diisobutyl hydride and aluminum diisobutyl mono-hydride, and a Brönsted-Lewis acid co-catayst selected from the group consisting of natural and artificial aluminum silicates, aluminum oxide, natural and artificial silicon oxides, decoloring clay, bauxite, and silica gel, said co-catalyst being in the ratio between 1% and 20% by weight with respect to said aluminum alkyl compounds, and carrying out the dimerization at a pressure between 200 atm. and 270 atm. and at a temperature of about 220° C.

References Cited

UNITED STATES PATENTS

| 2,912,423 | 11/1959 | Peters et al. | 252—449 |
| 2,388,428 | 11/1945 | Mavity | 260—683.15 X |
| 2,871,276 | 1/1959 | Eiszner | 260—683.15 |
| 3,004,087 | 10/1961 | Goddard et al. | 260—683.15 |
| 3,085,999 | 4/1963 | Tung | 260—683.15 X |
| 3,153,634 | 10/1964 | Thomas | 260—683.15 X |
| 3,168,504 | 2/1965 | Gordon et al. | 260—683.15 X |
| 3,238,249 | 3/1966 | Mirviss et al. | 260—683.15 X |

OTHER REFERENCES

Zharkova et al.: "Zhur. Obshch. Khim.," vol. 17, pages 1268–76, 1947.

DELBERT E. GANTZ, *Primary Examiner.*

PAUL M. COUGHLAN, JR., *Examiner.*

G. L. CRASANAKIS, R. H. SHUBERT,
*Assistant Examiners.*